(12) United States Patent
Hill

(10) Patent No.: US 10,964,206 B1
(45) Date of Patent: Mar. 30, 2021

(54) SIREN DETECTION SYSTEM FOR PLACEMENT AT TRAFFIC INTERSECTION

(71) Applicant: James L Hill, Show Low, AZ (US)

(72) Inventor: James L Hill, Show Low, AZ (US)

(*) Notice: Subject to any disclaimer, the term of this patent is extended or adjusted under 35 U.S.C. 154(b) by 0 days.

(21) Appl. No.: 15/330,345

(22) Filed: Sep. 8, 2016

Related U.S. Application Data

(60) Provisional application No. 62/283,787, filed on Sep. 11, 2015.

(51) Int. Cl.
| | |
|---|---|
| *G08G 1/07* | (2006.01) |
| *G08G 1/048* | (2006.01) |
| *H04W 76/50* | (2018.01) |
| *G08G 1/01* | (2006.01) |
| *G08G 1/087* | (2006.01) |

(52) U.S. Cl.
CPC .......... *G08G 1/048* (2013.01); *G08G 1/0137* (2013.01); *G08G 1/087* (2013.01); *H04W 76/50* (2018.02)

(58) Field of Classification Search
None
See application file for complete search history.

(56) References Cited

U.S. PATENT DOCUMENTS

| | | | |
|---|---|---|---|
| 2016/0355125 A1* | 12/2016 | Herbert | B60K 35/00 |
| 2017/0249839 A1* | 8/2017 | Becker | H04W 4/90 |
| 2018/0072222 A1* | 3/2018 | Herbert | B60R 22/48 |
| 2019/0004532 A1* | 1/2019 | Ferguson | G05D 1/0022 |
| 2020/0031337 A1* | 1/2020 | Soltanian | G05D 1/0088 |
| 2020/0225659 A1* | 7/2020 | Lockwood | G08G 1/165 |

\* cited by examiner

*Primary Examiner* — Julie B Lieu
(74) *Attorney, Agent, or Firm* — Tod R. Nissle, P.C.

(57) ABSTRACT

A traffic control system comprises a control unit and a plurality of speakers each configured to function as a microphone and having a DC resistance in the range of 20 to 30 ohms. The control unit monitors the DC resistance of each speaker and communicates malfunctions to a 24 hour emergency dispatch center which contacts repair personnel. The control unit also compares the frequency pattern of a siren to ambient noise at an intersection to distinguish siren sound from ambient noise.

1 Claim, 1 Drawing Sheet

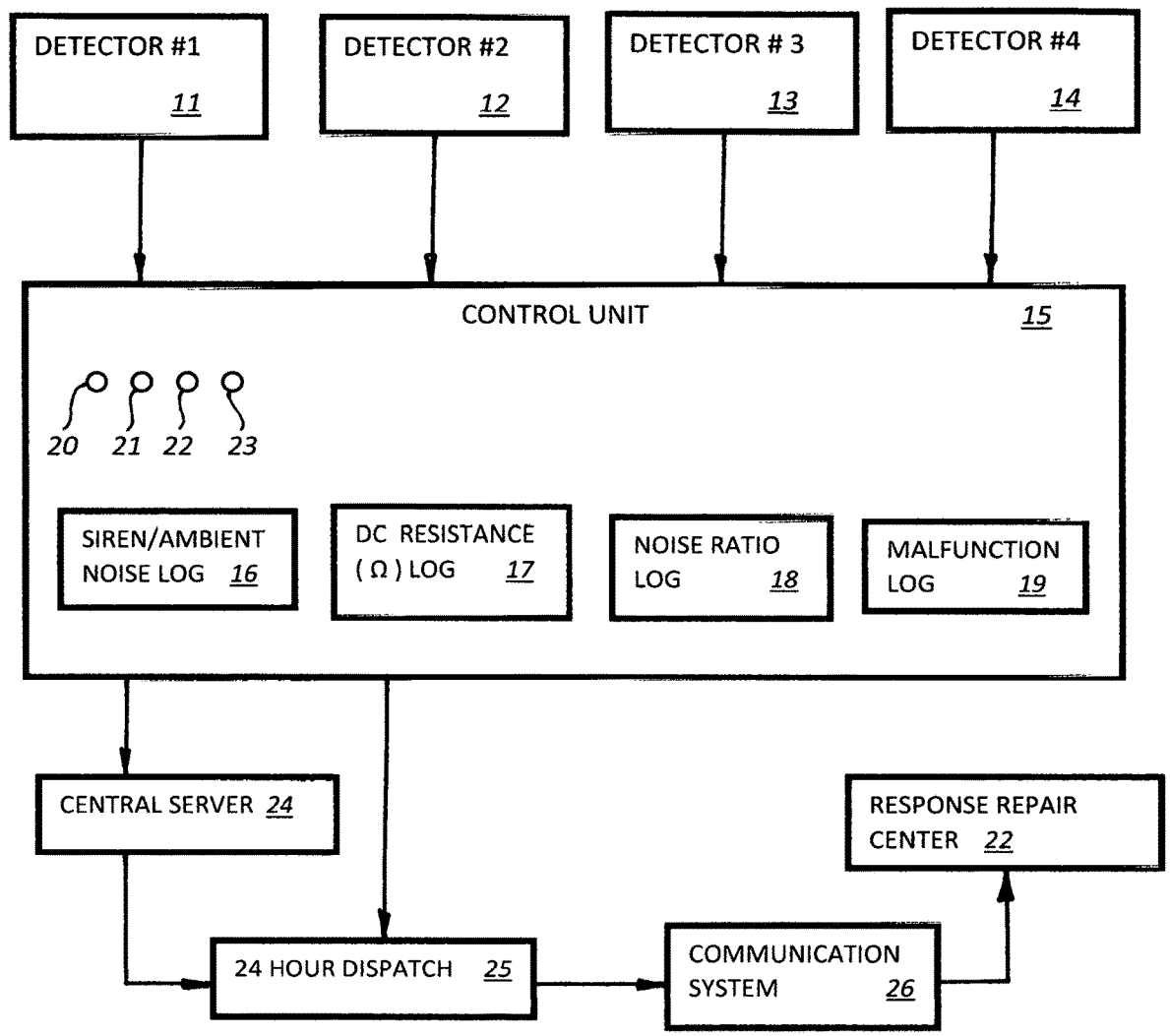

SIREN DETECTION SYSTEM FOR PLACEMENT AT TRAFFIC INTERSECTION

This application claims priority based on U.S. Provisional Patent Application Ser. No. 62/283,787 filed Sep. 11, 2015.

This invention relates to systems which are installed at traffic intersections to detect approaching emergency vehicles and control the flow of traffic at the intersection by manipulating traffic signals at the intersection.

Those of skill in the art have for many years endeavored to design and construct improved systems to control traffic flow at an intersection in response to an approaching emergency vehicle.

Accordingly, it would be high desirable to provide an improved traffic control system.

This, and other, further and more specific objects and advantages of the invention will be apparent to those of skill in the art based on the following description thereof, taken in conjunction with the drawing, in which:

FIG. 1 is a block flow diagram illustrating a traffic control system constructed in accordance with principles of the invention.

Briefly, an improved traffic control system is provided in combination with a traffic intersection. At least a pair of roads intersect at the intersection such that traffic approaches the intersection from four different directions.

The traffic control system comprises four speakers each mounted at the intersection and (a) pointed in a different one of the four directions to receive, in comparison to the remaining three speakers, a greater volume of sound from an emergency vehicle approaching the intersection from that direction, (b) configured to function as a microphone, (c) having a DC resistance in the range of 15 to 35 ohms, preferably 20 to 30 ohms, and (d) functioning independently of the other three speakers.

The traffic control system also comprises a server computer located remote from the intersection; a 24 hour emergency dispatch center located remote from the intersection; a response repair center with technicians trained to maintenance the traffic control system; and, a control unit mounted at the intersection.

The control unit monitors the impedance and output of each speaker separately; monitors the ambient noise at the intersection; monitors the number of malfunctions of a speaker in a group of malfunctions consisting at least of a DC resistance less than a selected value, and a DC resistance equal to infinity; including four malfunction lights each associated with a separate one of the speakers and illuminated when a selected number of malfunctions of the speaker is detected; increasing gain in at least one amplifier associated with at least one of the speakers when the DC resistance of the speaker falls below a selected level; and, transmitting a malfunction signal to at least one of the emergency dispatch center and the server computer when the number of malfunctions of one of the speakers reaches a selected level.

The traffic control system also includes a communication system 26 operatively associated with the 24 hour emergency dispatch system 25 and with a response repair center 22 to transmit from the emergency dispatch system 25 to the response repair center 22 requests to maintenance the traffic control system.

A traffic control system constructed in accordance with the invention is illustrated in FIG. 1. The traffic control is utilized in combination with a traffic intersection (not shown). At least a pair of roads intersect at the intersection from four different directions such that traffic approaches the intersection from four different directions.

The traffic control system comprises four speakers 11, 12, 13, 14 each mounted at the intersection and (a) pointed in a different one of the four directions to receive, in comparison to the remaining three speakers, a greater volume of sound from an emergency vehicle approaching the intersection from that direction, (b) configured to function as a microphone, (c) having a DC resistance in the range of 15 to 35 ohms, preferably 20 to 30 ohms, and (d) functioning independently of the other three speakers. With respect to DC resistance, speakers that are used in the presently preferred embodiment of the invention are 45 ohm impedance speakers which have a DC resistance in the range of 20 to 30 ohms.

Some intersections can be formed by the juncture of three or more roads. The very large majority, however, of intersections consist of the intersection of two streets, or roads. Furthermore, the since most intersections consist of a pair of roads which are perpendicular to one another, each speaker typically is 90 degrees from two of the other speakers and is co-linear with (but pointed in the opposite direction of) the remaining speaker, in much that way that the directions N, S, E, and W are arranged with respect to one another.

The traffic control system also comprises a server computer 20 located remote from the intersection; a 24 hour emergency dispatch center 21 located remote from the intersection; and a response repair center 22 with technicians trained to maintenance the traffic control system.

The traffic control system also includes a control unit 15 mounted at the intersection.

The control unit 15 (a) monitors the DC resistance and output of each speaker separately; (b) monitors the ambient noise at the intersection; (c) monitors the number of malfunctions of a speaker in a group of malfunctions consisting at least of a DC resistance less than a selected value, and of a DC resistance equal to infinity; (d) includes four malfunction lights 20, 21, 22, 23 which are each associated with a separate one of the speakers 11 to 14 and which each illuminate when a selected number of malfunctions of its associated speaker is detected; (e) increases gain in at least one amplifier associated with at least one of the speakers 11 to 14 when the DC resistance of the speaker falls below a selected level; and, (f) transmits a malfunction signal to at least one of the emergency dispatch center and the server computer when the number of malfunctions of one of the speakers reaches a selected level.

The traffic control system also includes a communication system 26 operatively associated with the emergency dispatch center 25 and response repair system center 22 to transmit from the emergency dispatch center 25 to the response repair center 27 requests to maintenance the traffic control system. Any desired communication methodology can be utilized: wireless, fiber optic, satellite, cellular, etc. Similarly, any desired communication methodology between control unit 15, server 24, and center 25 can be utilized.

In order to identify an approaching emergency vehicle, it is useful to monitor the ambient noise at an intersection. The normal level of ambient noise is typically in the range of 60 to 90 decibels. In accordance with the invention, an approaching emergency vehicle will utilize a class A siren (as defined by the California Code of Regulations) that typically will be emanating sound at a magnitude that is at least 30 dB higher than the normal level of ambient noise at an intersection. Ambient noise at an intersection often has frequencies which are similar to the sound frequencies produced by a siren on an emergency vehicle, i.e. ambient noise often includes sound having frequencies in the range of 300 to 1000 Hz. An important feature of the invention is that control unit 15 distinguishes between ambient noise and the sound produced by a siren by searching for a repeating frequency pattern that has frequencies in the range of 500 Hz to 2000 Hz and that repeats from 2.5 to 5 times per second, preferably that repeats from three to four and a half times a second. Such a pattern distinguishes the sound produced by the siren on an emergency vehicle from the ambient noise at an intersection.

The malfunction lights 20 to 23 in control unit 15 function to facilitate the job of a repair technician. In the event a speaker 11 to 14 has to be replaced at an intersection, in most cases only a single speaker has to be replaced and a malfunction light 20 to 23 usually readily identifies the speaker. The ability of control unit 15 to readily quickly indicate with lights 20 to 23 which speaker(s) is malfunctioning has been determined to be critical because in large cities where there are many traffic control systems, because technicians are not necessarily given correct information before they travel to a particular intersection, and because the cost of having technicians service many traffic control systems at many traffic intersections can grow to be a substantial portion of a city or state or federal budget.

Control unit 15 monitors each speaker 11 to 14. If there is no current representing a signal being generated, then the DC resistance may go to infinity, which normally indicates the speaker has to be replaced or repaired. Control unit 15 records this condition in malfunction log 19 (i.e., in a digital file) with respect to the appropriate speaker, and transmits a signal to server 24 and/or dispatch center 25 indicating that the speaker likely needs to be replaced. It is possible that the noise level at an intersection has decreased to about zero and that current indicating noise is therefore not being generated, but this is unlikely. In the unlikely event that a speaker indicates that no sound is being produced at an intersection, control unit 15 checks to confirm that the speaker is producing some current—if current if being produced then the speaker likely is operating properly. If no current is being produced, this indicates a malfunction and control unit 15 immediately transmits a signal to central server 24 and/or dispatch center 25 and records the malfunction in the malfunction log 19 with respect to the appropriate speaker. The ability to immediately signal center 25 or server 24 that a malfunction exists (so that center 27 can be notified) is critical because if a speaker fails then the traffic lights at an intersection may not be properly controlled when an emergency vehicle approaches. This can put non-emergency vehicles and the emergency vehicle at risk and generate lawsuits in the event there is an accident.

The DC resistance of each speaker 11 to 15 is periodically checked by control unit 15, and the results of such a check are recorded for each speaker in a DC resistance (0) log. Another malfunction which can be recorded in the malfunction log 19 is when the DC resistance of a speaker falls below a selected value, for example below 15 ohms, preferably below 20 ohms. Presently, if the DC resistance for a speaker falls below 20 ohms, the speaker is immediately scheduled to be replaced. The control unit 15 will, when the DC resistance of a speaker falls below a selected level, automatically increase the gain of an associated amplified to increase the strength of the signal from the speaker. However, even though control unit 15 will increase the gain when the DC resistance falls below 20 ohms (or falls below some other desired DC resistance value), the speaker is immediately scheduled for replacement. Such replacement has been determined to be critical because if a speaker fails to recognize the presence of an emergency vehicle until it is too close to an intersection, there is not enough time to properly control the traffic signals at the intersection to allow the emergency vehicle to safely pass through the intersection. In some embodiments of the invention, the gain is not automatically increased by control unit 15 in order to compensate for a low DC resistance reading for a speaker, but is increased remotely by the dispatch center 25 (or server 24) when the center 25 receives from control unit 15 a notification that the DC resistance has fallen below a selected level. By way of example, and not limitation, the center 25 may increase gain for a speaker or send other commands to control unit 15 by using an iPad, iPhone, or other desired electronic device.

In one embodiment of the invention, the DC resistance of all of the speakers at an intersection is compared and gain is increased (or decreased) as necessary so that the strength of signals emanating from each speaker are, for an emergency vehicle which approaches each speaker directly and has a signal with a specific decibel level (say 130 decibels), generally the same.

When an emergency vehicle approaches an intersection, the speaker directly facing the oncoming emergency vehicle produces a stronger signal that the other remaining speakers. For example, if the directly facing speaker produces a signal indicating 120 decibels (60 decibels above an ambient noise level of 60 dB at the intersection), then each of the two speakers which are perpendicular to the directly facing speaker may produce a signal indicating 100 decibels (40 decibels above the ambient noise of 60 decibels at the intersection). Consequently, in this example, the ratio of the noise level in excess of ambient noise (i.e., 60 dB) detected by the directly facing speaker with respect to the noise level in excess of ambient noise (40 decibels) detected by each of the perpendicular speakers is 3:2. That is a typical ratio. Other typical ratios may be 2:1 or 3:1. Regardless what the typical, and expected, ratios are between speakers when all speakers are operating properly, such ratios are routinely periodically checked by control unit 15 and recorded in the noise ratio log 18. If such ratios between a pair of speakers are off the normal ratio by a selected amount, say 25% or more (or any other selected amount), this can be recorded as a malfunction and reported to server 24 and/or center 25.

The ambient noise at the intersection is routinely periodically checked by control unit 15 and recorded in ambient noise log 16, which is another electronic file. The noise levels detected by speakers of the sirens of approaching emergency vehicles are also recorded in log 16.

Logs 16 to 19 can be remotely electronically queried from center 25 or any other desired location, and can be queried electronically at the intersection by a technician who is at control unit 15.

The use of 45 ohm impedance speakers with a 20 to 30 ohm DC resistance is critical in the practice of the invention in being able to detect effectively sound frequencies in the range of 500 Hz to 2000 Hz, preferably in the range of 800 Hz to 1200 Hz.

Having described my invention in such terms as to enable those skilled in the art to make and use the invention, I claim:

1. In combination with a traffic intersection at which at least a pair of road intersect such that traffic approaches the intersection from four different directions, a traffic control system comprising (a) four speakers each
  (i) mounted at the intersection and pointed in a different one of said directions to receive, in comparison to the remaining three speakers, a greater volume of sound from an emergency vehicle approaching the intersection from that direction,
  (ii) configured to function as a microphone,
  (iii) having a DC resistance in the range of 20 to 30 ohms, and
  (iv) functioning independently of the other three speakers;
(b) a server computer located remote from the intersection;
(c) a 24 hour emergency dispatch center located remote from the intersection;
(d) a response repair center with technicians trained to maintenance the traffic control system;
(e) a control unit mounted at the intersection for
  (i) monitoring the DC resistance and output of each speaker separately,
  (ii) monitoring the ambient noise at the intersection,
  (iii) monitoring the number of malfunctions of a speaker in a group of malfunctions consisting at least of a DC resistance less than a selected value, and a DC resistance equal to infinity,
  (iv) controlling four malfunction lights each associated with a separate one of said speakers and illuminated when a selected number of malfunctions of the speaker is detected,
  (v) increasing gain in at least one amplifier associated with at least one of said speakers when the DC resistance of the speaker falls below a selected level, and
  (vi) transmitting a malfunction signal to at least one of said emergency dispatch center and said server computer when the number of malfunctions of one of said speakers reaches a selected level; and
(f) a communication system operatively associated with said emergency dispatch system and response repair system to transmit from said emergency dispatch system to said response repair system requests to maintenance said traffic control system.

\* \* \* \* \*